United States Patent [19]
Lewis

[11] 3,837,594
[45] Sept. 24, 1974

[54] SEAT BELT RETRACTOR APPARATUS

[76] Inventor: Gerald F. Lewis, 1850 Columbia, Berkley, Mich. 48072

[22] Filed: Apr. 6, 1972

[21] Appl. No.: 241,539

[52] U.S. Cl. ............................. 242/107.4, 188/139
[51] Int. Cl. ..................... A62b 35/02, B65h 63/04
[58] Field of Search .................. 242/107.4, 107 SB; 297/388; 280/150 SB; 188/139, 107.3, 107.2

[56] References Cited
UNITED STATES PATENTS

| | | | |
|---|---|---|---|
| 2,650,655 | 9/1953 | Neahr | 242/107.4 |
| 2,708,966 | 5/1955 | Davis | 242/107.4 |
| 3,100,609 | 8/1963 | Wrighton | 242/107.4 |
| 3,180,456 | 4/1965 | Whittingham | 242/107.4 |
| 3,508,720 | 4/1970 | Kell | 242/107.4 |
| 3,521,832 | 7/1970 | Rex | 242/107.4 |
| 3,635,420 | 1/1972 | Romanzi, Jr. | 242/107.4 |

*Primary Examiner*—John W. Huckert
*Assistant Examiner*—Jon W. Henry
*Attorney, Agent, or Firm*—Fisher, Krass, Young & Gerhardt

[57] ABSTRACT

Seat belt retractor apparatus having a spring biased latching device for locking the seat belt in a selected extended position. The latching device incorporates a latch that is releasably held in an unlatched position by a condition responsive latch holding device so that the seat belt user is permitted free movement and also to preclude premature latching prior to the belt being buckled. The condition responsive latch holding device responds to inertia forces in any direction acting on the retractor apparatus and when of a certain magnitude will release the latch for movement to the latched position. A latch positioning device is also included that prevents ratcheting during rotation of the belt in the belt retracted direction, that can be used to reset the holding device, and that insures that latching occurs in the event that the condition responsive latch holding device malfunctions. This interaction of the two devices is facilitated by a lost motion connection therebetween.

12 Claims, 17 Drawing Figures

PATENTED SEP 24 1974 3,837,594

SEAT BELT RETRACTOR APPARATUS

DISCLOSURE

This invention relates to improvements in seat belt retractor apparatus of the latching type.

Conventional seat belt retractor apparatus functions to store the outboard belt to prevent entanglement with the seat and the door. In operation, when the belt is to be used, it is extended and buckled. When buckled, latching is intended to occur which precludes further extension of the belt so as to restrain the seat occupant from movement in the event of an accident or any other condition where restraint is desired. This apparatus can prematurely latch prior to the buckling in which event the seat belt user has to retract the belt and start over. Also when the belt is buckled, it can be too tight or unduly restrictive so as to inconvenience the user. For these reasons various devices have been proposed that preclude latching until restrain is needed, such as occurs at impact. As can be appreciated, if the device malfunctions, there will be no latching and, of course, no restraint.

With the foregoing in mind, new and different seat belt retractor apparatus is contemplated that only latches on the occurrence of a predetermined condition and that insures latching in the event of a malfunction.

Also contemplated is unique seat belt retractor apparatus of the latching type that incorporates a condition responsive latch holding device for precluding latching until the occurrence of a predetermined condition and a latch positioning device which insures that latching occurs if the condition responsive latch holding device malfunctions. Further contemplated is such a seat belt retractor apparatus that combines in a unique way a latch positioning device and a condition responsive latch holding device which precludes latching until the occurrence of the predetmined condition.

Other objects include the provision of seat belt retractor apparatus of the latching type that incorporates a condition responsive latch holding device for restraining latching until the occurrence of inertia forces of a certain magnitude; that includes a latch positioning device which prevents ratcheting and that is interrelated with the condition responsive latch holding device in a novel way to insure that latching occurs in the event of a malfunction; that cooperates with the inertia responsive device to reset the inertia responsive device; and that has a minimum number of easily made and assembled parts which when assembled consume a minimum of space. predetermined The foregoing and other objects and advantages of the invention will become apparent from the following description and from the accompanying drawings in which:

FIG. 10 is a plan view of another embodiment of the retractor apparatus;

FIG. 11 is a sectional view of the FIG. 10 apparatus taken along line 11—11 of FIG. 10;

FIG. 12 is a fragmentary sectional view of a condition responsive latch holding device for the FIG. 10 retractor apparatus taken along line 12—12 in FIG. 11;

FIG. 13 is a view of the condition responsive latch holding device in FIG. 12 looking in the direction of arrows 13—13 in FIG. 12;

FIGS. 14 and 15 are sectional views similar to FIG. 11 showing different positions of the FIG. 10 retractor apparatus; FIG. 17 is a fragmentary plan view partially in section and taken along line 17—17 in FIG. 16.

Figure 1:
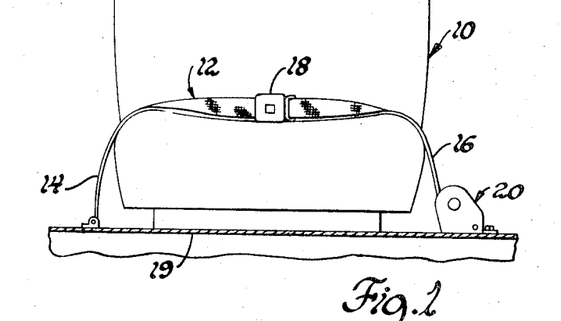
FIG. 1 is a schematic illustration of seat belt retractor apparatus incorporating the principles of the invention shown installed on a vehicle seat.

Referring first to FIG. 1, the numeral 10 denotes a vehicle seat or the like incorporating a seat belt 12. The seat belt 12 has an inboard belt 14, an outboard belt 16 and a buckle 18 which joins the inboard and outboard belts 14 and 16 together in a well known way. The inboard belt 14 is grounded to the vehicle frame 19 or the equivalent, whereas the outboard belt 16 is grounded to the frame 19 of the vehicle through seat belt retractor apparatus 20 which functions to retract the outboard belt 16 and store it when not being used. This avoids as is well known entanglements of the outboard belt 16 in the door or seat. The seat belt retractor apparatus 20 as will be explained incorporates unique features that preclude premature latching and also avoid the imposition uncomfortable, inconvenient restraint upon the user of the seat belt 12.

Figure 2:
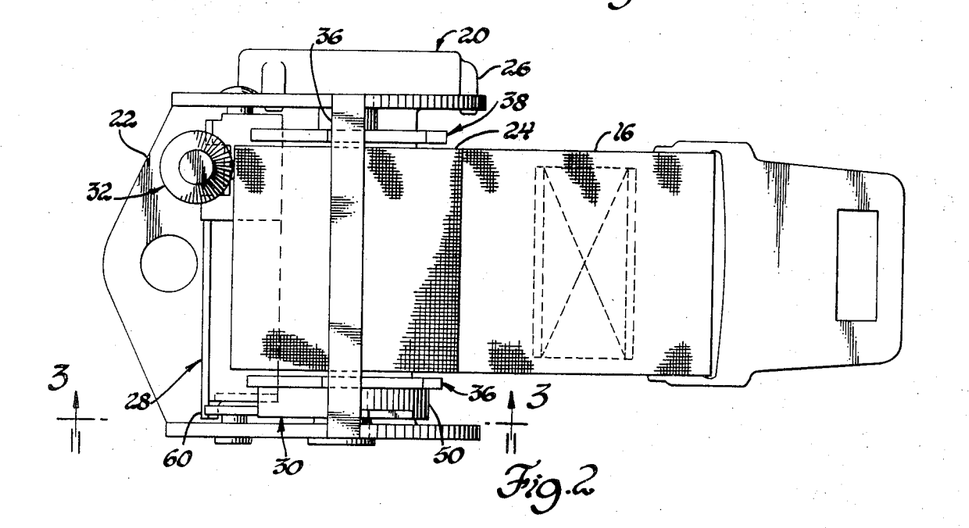
FIG. 2 is a plan view of one embodiment of the seat belt retractor apparatus.

Referring next to FIGS. 2 to 6 inclusive and first to FIG. 2, the seat belt retractor apparatus 20 has a frame 22 which bolts to the vehicle frame 19. This frame 22 rotatably supports a seat belt reel 24 on which the outboard belt 16 is wound. A reel spring 26 in a well known way provides a constant bias for retracting the reel 24 to the illustrated FIG. 2 position. Once the seat belt 12 is in the FIG. 1 position, a latching device shown generally at 28 provides restraint of further movement of the outboard belt 16 in the belt extended direction and thereby maintains the occupant safely in the seat 10, in the event, for example, of a vehicle crash. To facilitate belt extended movement of the outboard belt 16 under conditions to be explained, to prevent the ratcheting noise during retracted movement, and to provide latch resetting a latch positioning device 30 that positions the latching device 28, as will be described, is employed. Also a condition responsive latch holding device shown generally at 32 and which is responsive to some condition that indicates restraint is required; for example and without limitation, inertia forces prevents the latching device 28 from becoming operative until these inertia forces, which would be of an extent corresponding to an acceleration or deceleration that require restraint, are exceeded.

The frame 22 has a generally U-shaped configuration and incorporates a cross shaft 34 on which is revolvably supported the reel 24. The frame 22 also includes a stop bar 36 that serves a function to be explained. The reel 24 is urged to the FIG. 2 position by the reel spring 26 as mentioned.

To perform its function of holding the outboard belt 16 in some selected extended position the latching device 28 comprises a pair of ratchet wheels 38 positiond on each side of the outboard belt 16 and either made integral with or appropriately joined to the reel 24 for rotation therewith. Each ratchet wheel 38 has a series of teeth 40 which are in alignment and are shaped so as to permit unimpeded retraction of the outboard belt 16, but are engagable with a bar like latch 42 to preclude further extension of the belt 16. The latch 42 in the FIG. 2 embodiment is revolvably supported at its ends by the frame 22. A spring 44 constantly biases the latch 42 to the FIG. 5 latched position. The latch 42 has a belt engaging portion 46 which is engaged by the belt 16 when retracted so that the latch 42 is urged to the FIG. 3 position which will hereinafter be referred to as the first or initial unlatched position. The latch 42 further includes a hook portion 48 which in a second or set unlatched position of the latch 42 is engaged by the condition responsive latch holding device 32 as will be explained.

As mentioned the latch positioning device 30 serves the function of permitting the belt 16 to be retracted even though the condition responsive latch holding device 32 has malfunctioned and also holds the latch bar 42 away from the ratchet wheel teeth 40 during retraction so as to avoid the ratcheting sound. To do this, the latch positioning device 30, as shown in FIGS. 2 through 6, inclusive, includes an annular hub 51 revolvably positioned on the cross shaft 34 between the frame 22 and one of the ratchet wheels 38. The hub 50 encloses a coil type compression spring 52 which is interposed between the frame 22 and the annular hub 50 so as to constantly urge the hub 50 into frictional engagement with the ratchet wheel 38. This frictional engagement serves a clutch function whereby the hub 50 is releasably rotated with the ratchet wheel 38 for a limited extent in both the belt retracted and belt extended directions of the outboard belt 16. This restricted movement is provided by stop surfaces on stop arms 54 and 56 which extend outwardly from the hub 50 into the path of the stop bar 36 on the frame 22. The extent of movement of the hub 50, and therefore, of the latch positioning device 30 is determined by the angular distance the stop arms 54 and 56 are separated. For example, when the outboard belt 16 is moved in the belt retracted direction, the latch positioning device 30 will revolve from the FIG. 6 fully extended position in which the stop arm 56 engages the stop bar 36 to the FIG. 3 position in which the stop arm 54 engages the stop bar 36. During retraction of the outboard belt 16, the stop arm 54 disengages the stop bar 36 and then the stop arm 56 engages the stop bar 36 as shown in FIG. 6. When either of the stop arms 54 or 56 engage the stop bar 36, the clutching function of the latch positioning device 30 occurs whereby the latch positioning device 30 is declutched due to the interruption of the frictional maintained engagement and it no longer rotates with the ratchet wheel 38.

Figure 3:
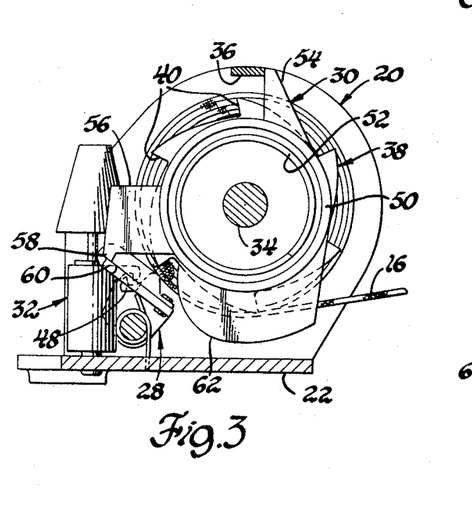
FIGS. 3 through 6 are sectional views of the FIG. 2 retractor apparatus all taken along line 3—3 of FIG. 2 and showing the retractor apparatus in different positions.

When the latch positioning device 30 is rotated to the FIG. 3 position during belt extended movement of the belt 16, a dog or cam surface 58 on the stop arm 56 moves to a latch restraining setting in engagement with an extension 60 of the latch 42 and urges it to the initial unlatched position depicted in FIG. 3. In this way the latch 42 is prevented from moving into the FIG. 5 latched position with respect to the teeth 40 of the ratchet wheel 38 so as to not restrain further movement of the outboard belt 16 in the belt extended direction. As will become apparent, this function is required to prevent the latch 42 from engaging the ratchet wheel teeth 40 in the event of a malfunction of the condition responsive latch holding device 32. Once the outboard belt 16 is in the desired extended position and the positioning device 30 is in the FIG. 3 illustrated position, the user of the seat belt 12 will buckle up and in so doing the outboard belt 16 will be permitted to be retracted slightly. This slight retracting movement of the reel 24 and correspondingly the ratchet wheel 38 will through the clutching provided by the spring 52 cause the latch positioning device 30 to be rotated slightly clockwise to the FIG. 4 position in which the stop arm 54 is slightly displaced from the frame stop bar 36 and the stop arm 56 is displaced to a latch releasing setting so that the cam surface 58 will be revolved out of engagement with the latch 42. The latch 42 will now move, due to the bias of the spring 44, to the FIG. 4 set unlatched position which is maintained by the condition responsive latch holding device 32.

To avoid the ratcheting sound during retraction of the outboard belt 16, the latch positioning device 30 is provided with a cam surface 62 that extends from the hub 50 and into engagement with the latch extension 60 so as to first disengage the latch 42 from the ratchet wheel teeth 40 and then hold the latch 42 in the FIG. 6 position during the movement of the outboard belt 16 in the belt retracted direction. This position corresponds to the set unlatched position of the latch 42 and, thus, the cam surface 62 effects a resetting of the latch 42 with the condition responsive latch holding device 32. This resetting of the latch 42 is an additional function provided by the latch positioning device 30.

Figure 4:
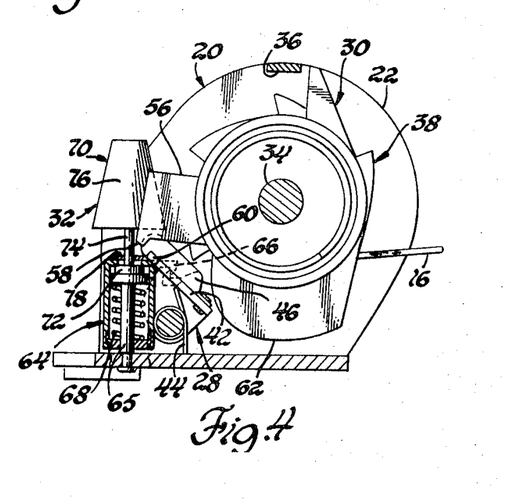
Figure 5:
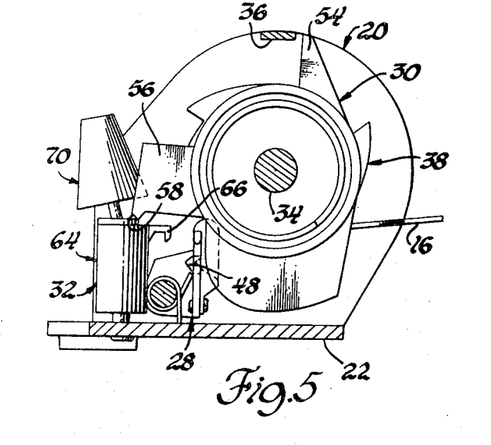
Figure 6:
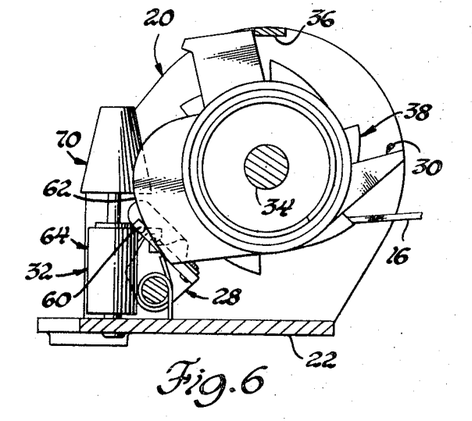

Once the seat belt 12 is buckled and the cam surface 58 has disengaged the latch extension 60, the latch 42 would, in the absence of the latch holding device 32, assume the latched position viewed in FIG. 5 with respect to the teeth 40 of the ratchet wheel 38. Hence, the seat belt 12 would restrain any movement of the occupant which may be unduly restrictive to the point where it is uncomfortable. Also, any slight movement of the seat belt 16 in the belt retracted direction will create the FIG. 4 condition and if the seat belt 12 has not been buckled, the latch 42 will be biased to the latched position. Therefore, the occupant cannot buckle the seat belt 12 without the belt 16 being retracted far enough towards the FIG. 6 position to enable the latch positioning device 30 to effect a disengagement of the latch 42 from the ratchet wheel teeth 40.

The aforediscussed problem is overcome by the condition responsive latch holding device 32, which as viewed best in FIG. 4, comprises a locking device 64 of a cylindrical form. The locking device 64 is slidably positioned on a support or guide rod 65 which is appropriately attached to the frame 22. The locking device 64 has a locking portion 66 of hook like shape which engages, in the locking position thereof, the hook portion 48 on the latch 42 and thus holds the latch 42 in its FIG. 4 set unlatched position. The locking device 64 is urged to this locking position by a spring 68 which opposes any inertia forces acting on a pendulum 70. This pendulum 70 comprises a flange portion 72 which seats on the support rod 64, a rod portion 74, which extends upwardly from the flange portion 72, and a weighted portion 76 which is positioned at the other end of the rod portion 74. The rod portion 74 has a dust cover 78 that is movable therewith to prevent dust from entering the locking device 64. The weight of the weighted portion, the proportions of the pendulum 70 and the strength of the spring 68 all will determine the magnitude of the inertia force to which the pendulum 70 will respond. Whenever the acceleration or deceleration forces imposed upon the retractor apparatus 20 are of a certain extent corresponding to these requiring the restraint of the seat belt 12, the pendulum 70 will, in response to the resultant inertia forces regardless of the direction, upset or tilt, for example, to the FIG. 5 unset position from the FIG. 3 set position. This tilt of the pendulum 70 will through the flange portion 72 move the locking device 64 upwardly so that the locking portion 66 will disengage the hook portion 48 of the latch 42 and permit the latch 42 to be biased to its FIG. 5 latched position. Thus, the outboard belt 16 will be restrained from further movement in the belt extended direction and the necessary restraint is provided for the occupant of the vehicle seat 10. Once the inertia forces are removed the spring 68 will urge the locking device 64 back to its FIG. 4 locking position in which the locking portion 66 will reengage the latch bar hook portion 48 when the outboard belt 16 is retracted to the FIG. 6 set unlatched position of the latch 42.

To describe the operation, the retractor apparatus 20 displayed in FIGS. 2 through 6 will be assumed initially to be in the FIG. 3 belt fully retracted position with the latching device 28 being held in its first or initial unlatched position by the belt 16, the condition responsive latch holding device 32, as also depicted, with the locking device 64 in its locking position and the positioning device 30 in its FIG. 6 setting. The outboard belt 16 is then moved by the seat occupant in the belt extended direction. The positioning device 30 will be rotated counterclockwise with the reel 24 due to the clutching frictional engagement with the ratchet wheel 38 until the stop arm 54 engages the stop bar 36 in which position the cam surface 58 will engage the latch extension 60 and maintain the latching device 28 in its FIG. 3 initial unlatched position, which the condition responsive latch holding device 32 permits due to the loss motion connection viewed in FIG. 3 between the latch bar hook portion 48 and locking device locking portion 66. The subsequent joining of the belts 14 and 16 by the buckle 18 results in a slight retraction of the belt 16, and therefore, the latch positioning device 30 will be rotated slightly clockwise as viewed in FIG. 4 to the FIG. 4 position so that the cam surface 58 will disengage the latch extension 60 and permit the latch 42 to be biased to the second or set unlatched position with the latch hook portion 48 now in engagement with the locking device locking portion 66. There will be no restraint on the occupant of the seat 10 by the seat belt 12 until the inertia forces acting on the condition responsive holding device 30 and specifically the pendulum 70 exceed a certain magnitude corresponding to that determined to require restraint on the occupant of the seat 10 by the seat belt 12.

When these inertia forces do exist, the pendulum 70 will tilt and in tilting will through the action of its flange portion 72 on the locking device 64 raise the locking device 64 upwardly as viewed in FIG. 5 so that the locking device locking portion 66 will disengage the latch hook portion 48 and permit the latch 42 to be biased to the FIG. 5 latched position. As mentioned. once the inertia forces are removed, the spring 68 will urge the pendulum 70 back to the FIG. 4 locking position. Subsequently, when the outboard belt 16 is to be stored, the biased reel 24 will urge it in the belt retracted direction whereupon the latch positioning device 30 by means of the cam surface 62 will engage the latch extension 60 and urge the latch 42 out of engagement with the ratchet wheel teeth 40 and to its set unlatched position. Subsequently, the outboard belt 16 will reengage the belt engaging portion 46 on the latch 42 and/or move the latch 42 to the FIG. 3 initial unlatched position.

It is intended as previously discussed, that the positioning device's cam surface 62 will after a slight movement in the belt retracted direction, urge the latch 42 back to the FIG. 6 set unlatched position and thereby always effect a reset or reengagement of the latch hook portion 48 with the condition responsive holding devices locking device locking portion 66. Further, it is preferred that this extent of movement would be that occurring when the occupant goes back into the seat after being subjected to the mentioned inertia forces. Hence, the condition responsive latch holding device 32 is almost immediately reset to allow the occupant of the seat 10 complete freedom until again there is a need for restraint, when the condition responsive device 32 will again function in the mentioned way to permit the latch 42 to be biased to the FIG. 5 latched position.

If for some reason, the condition responsive latch holding device 32 malfunctions and remains in the FIG. 5 tilted position, the retractor apparatus 20 can still be operated. For example, the positioning device 30 will function as before during retraction; i.e., movement of the outboard belt 16 in the belt retracted direction and the positioning device cam surface 62 will engage the latch extension 60 and urge the latch 42 out of engagement with the ratchet teeth 40 and to the FIG. 6 set unlatched position after which the outboard belt 16 will reengage the belt engaging portion 46 of the latch 42 and urge it further to the FIG. 3 initial unlatched position. Subsequently, when the belt 16 is to be moved in the belt extended direction, the latch positioning device 30 is revolved the angular amount permitted prior to the engagement of the stop arm 54 with the stop bar 36 on the frame 22 so that the cam surface 58 engages the latch extension 60 and urges the latch 42 to its FIG. 3 initial unlatched position. Then when the aforementioned slight retraction occurs during the buckling of the seat belt 12, the cam surface 58 will disengage the latch extension 60. Now with the condition responsive latch holding device 32 inoperative, the latch 42 will be biased to its FIG. 5 latched position to provide restraint of the occupant in the seat 10, even though the condition responsive holding device 32 is malfunctioning.

Figure 7:
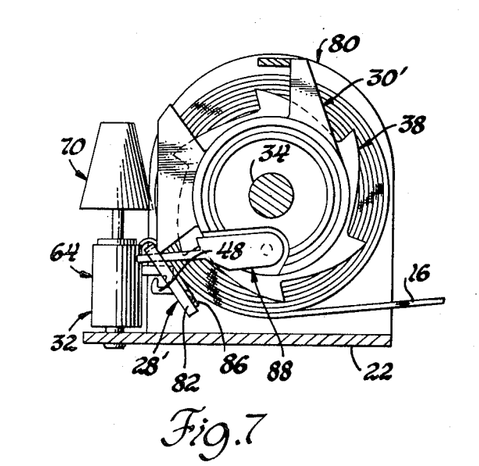
FIGS. 7, 8, and 9 are views similar to those depicted in FIGS. 3 through 6 inclusive showing a modification of the FIG. 2 apparatus in different positions.
Figure 8:
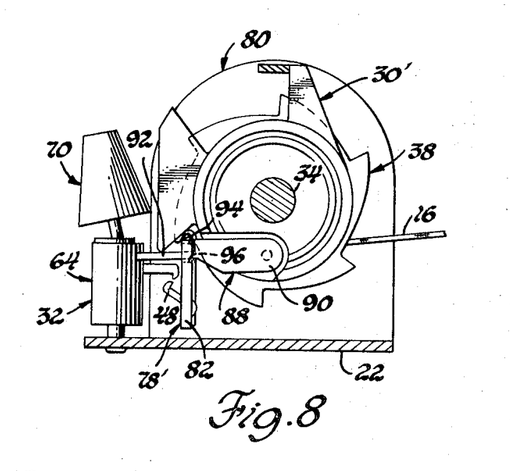
Figure 9:
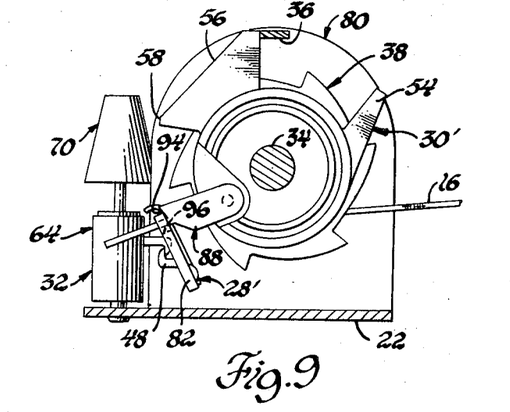

Referring next to FIGS. 7, 8 and 9 the numeral 80 denotes modified seat belt retractor apparatus. In these FIGURES those parts of the retractor apparatus 80 which are the same as corresponding parts of the retractor apparatus 20 have the same numeral, and those parts which are similar have the same number but with a prime (') added. The retractor 80 has both a different latching device 28' and a different latch positioning device 30'.

In describing the latching device 28', it should be kept in mind that the latching device 28 shown in FIGS. 1 through 6 inclusive could be employed. This latching device 28' as depicted in FIGS. 10 and 13 includes a latching 82 formed as a substantially one piece structure with its ends revolvably supported by the frame 22.

A leaf spring 84, which is anchored at its opposite ends to the latch 82 and to the frame 22, biases the latch 82 towards the latched position viewed in FIG. 8. The belt engaging function is provided by a curved belt engaging element 86, which is appropriately attached by rivets or the like to the latch 82.

The latch positioning device 30' is the same as the positioning device 30 except that a cam element 88 is employed in place of the cam surface 62 for the positioning device 30. This cam element 88 is pivotally joined to the hub 50 at 90 and includes a rod portion 92 that extends from a cam surface 94 and through an appropriate opening 96 in the latch 82.

Functionally, the retractor apparatus 80 operates much the same as the retractor apparatus 20. In operation, commencing with the retractor in the retracted position shown in FIG. 7; i.e., with the belt 16 in its stored position, the positioning device 30' through the intermediary of the cam surface 58 will hold the latching device's latch 82 in the depicted initial unlatched position. In this position a lost motion connection is provided between the locking portion 66 of the condition responsive latch holding device 32 and the hook portion 48 of the latching device 28'. This initial unlatched position will be maintained until the belt 16 is unwound for buckling when as before a buckling movement will result in the latch positioning device 30' being revolved slightly clockwise, as viewed in FIG. 9. As a result, the cam surface 58 will disengage the latch 82 and it will be biased by the spring 84 to the FIG. 9 set unlatched position with the latching device's hook portion 48 engaging the latch holding device's locking portion 66. The latching device 28' will remain in this set unlatched position until the condition responsive latch holding device 32 is subjected to an inertia force of the selected magnitude. This inertia force will upset the pendulum 70 to the FIG. 8 position so as to disengage the locking portion 66 from the latching device's hook portion 48. The latch 82 will then be biased into engagement with the teeth 40 on the ratchet wheel 38 to provide the required belt restraint.

Any slight subsequent movement of the belt 16 in the belt retracted direction, as when the occupant returns to the seat after the selected inertia is removed, will result in the reel 24 and correspondingly the positioning device 30' being revolved to the FIG. 9 position. During this rotation, the positioning device's cam element 88 will through the cam surface 94 engage the side of the latch 82 and move it back to the FIG. 9 set unlatched position. Thus, as with the retractor 20, a slight movement in the belt retracting direction of the positioning device 30' will reset the latching device 28' in its set unlatched position so that the occupant can move without undue restraint. Again if the condition responsive latch holding device 32 fails and does not return to the FIG. 9 position, the latch 82 will be biased back to the FIG. 8 position once the belt 16 is moved slightly in the opposite or belt extended direction to insure that restraint is provided even though the condition responsive latch holding device 32 has malfunctioned. This is because the latch positioning device's cam surface 58 will have not engaged the latch 82 as shown in FIG. 7. Of course, if the cam surface 58 does assume the FIG. 7 position as discussed, a slight movement of the belt 16 in the belt retracted direction will release the latch 82.

In FIGS. 10 through 15 inclusive, another modified retractor apparatus denoted by the numeral 98 is displayed. As before, the same numerals as employed with respect to the retractor apparatus 20 are used to denote identical parts and numerals with a prime (') or double prime ('') are used to denote similar parts. This retractor apparatus 98 has both a different condition responsive latch holding device 32' and a different latch positioning device 30''. This modification employs the same latching device 28' as described furing discussion of FIGS. 7, 8 and 9.

Describing first the condition responsive latch holding device 32; reference is made to FIG. 12 where as depicted the condition responsive latch holding device 32' includes a locking device 100 in cylindrical form with an end slot 102 and a locking edge or portion 104. A pendulum designated generally by the numeral 106 has a rod portion 108 positioned between a weighted portion 110 and a flange portion 112. The flange portion 112 seats on top of a movable plunger 114 which is urged to the illustrated FIG. 12 position by a spring 116. A dust cover similar to the dust cover 78 employed by the condition responsive latch holding device 32 can be included if desired. Once the pendulum 106 is subjected to inertia forces in any direction of the aforementioned predetermined magnitude, the pendulum 106 will tilt and force the plunger 114 downwardly against the bias from the spring 116 and cause the unlocking to occur in a way to be explained.

The latch positioning device 30'', viewed in FIG. 11, is similar to the latch positioning device 30 shown in FIG. 3 except that the cam surface 62 has been omitted and its function is carried out by a cam element 118 which is pivotally joined at 120 to the positioning device's hub 50. This cam element 118 has a rod portion 122 that extends through the latch opening 96 into the slot 102 in the device 100 of the condition responsive latch holding device 32'. The rod portion 122 has a notch 124 that engages, as viewed in FIG. 12, the locking portion 104 of the device 100 in the FIG. 12 position. The cam element 118 also includes a cam surface 126 which performs to urge the latch 82 out of engagement with the ratchet 38 during rotation of the reel 24 in the belt retracted direction.

Operationally the retractor apparatus 98 also performs much in the same way as the retractor apparatus 20. Starting with the belt in the stored position; i.e., with the belt 16 fully retracted as viewed in FIG. 14, the latch positioning device 30' will be positioned as illustrated in moving to this position from the FIG. 15 position, the cam element 118 through the engagement of the cam surface 126 with the latch 82 and the retracted belt's subsequent engagement with the belt engaging element 86 will have forced the latch 82 to the initial unlatched position. With the belt 16 next being unreeled, the latch positioning device 30'' will move to the FIG. 11 position with the stop arm 54 engaging the stop bar 36 on the frame 22. Also, the cam surface 58 on the stop arm 56 will move into engagement with the latching device 28' and hold it as depicted in FIG. 11. In this initial unlatched position, as will be noted in FIG. 11, the notch 124 is spaced a slight distance from the locking portion 104 on the locking device 100 so as to provide the lost motion connection. Subsequently, upon buckling the belt 12, the slight retracting movement of the reel 24 in the belt retracted direction during buckling will disengage the cam surface 58 from the latch 82 so that the latch 82 can be biased to the set unlatched position depicted in FIG. 12 and still out of engagement with the ratchet wheel 38. In this latter set unlatched position as displayed in FIG. 12, the edge of the notch 124 engages the locking portion 104 on the locking device 100 of the condition responsive latch holding device 32'.

If now, the inertia forces acting upon the condition responsive device's pendulum 106 exceed the desired predetermined magnitude, the pendulum 106 will move to its tilted position and through the flange portion 112 urge the plunger 114 from its FIG. 12 position downwardly and in turn force the cam element 118 therewith so that the notch 124 disengages the locking portion 104 on the locking device 100. The latching device 28' now will assume the FIG. 15 position with the latch 82 in engagement with the teeth 40 of the ratchet wheel 38, and restraint will be provided. Any subsequent rotation of the reel 24 in a belt retracted direction will, through the cam surface 126 on the cam element 118 engage the latch 82 and force it out of engagement with the teeth 40 of the ratchet wheel 38 so that noiseless retraction can be accomplished. Also, if the rotation of the reel 24 is slightly further the latch 82 will be returned to its set unlatched position by the reengagement of the notch 124 with the locking portion 104. This movement is facilitated by the ability of the cam element 118 to pivot on the hub 50 of the positioning device 30''. Thus, the positioning device 30'' can be rotated between the FIG. 14 and FIG. 11 positions without the latch 82 becoming released.

Figure 16:
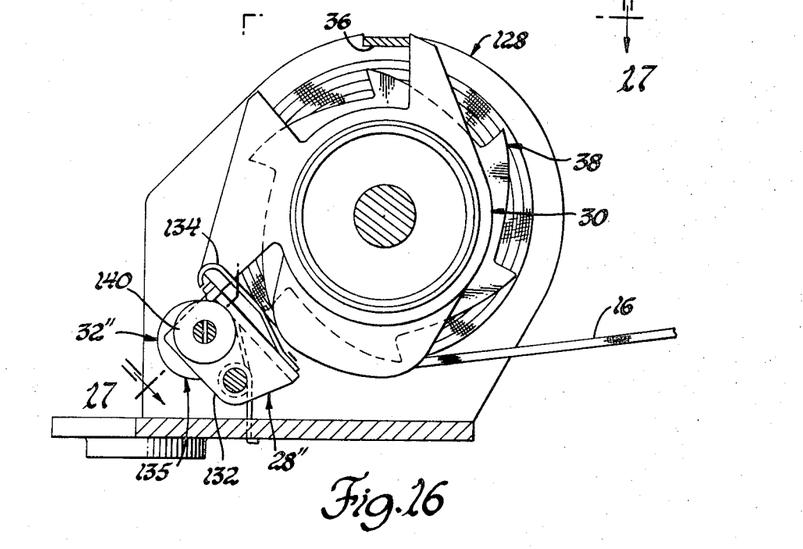
FIG. 16 is a sectional view of another embodiment of the retractor apparatus.
Figure 20:
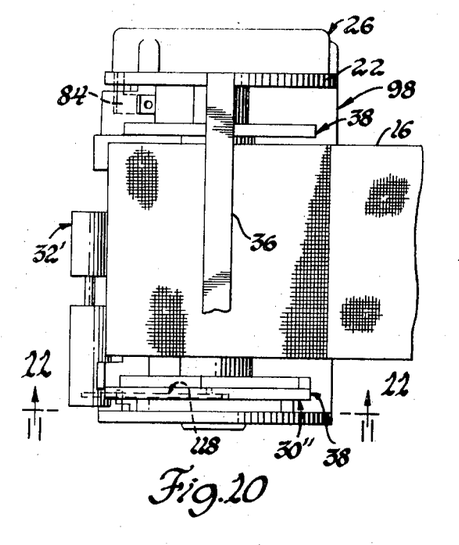
Figure 21:
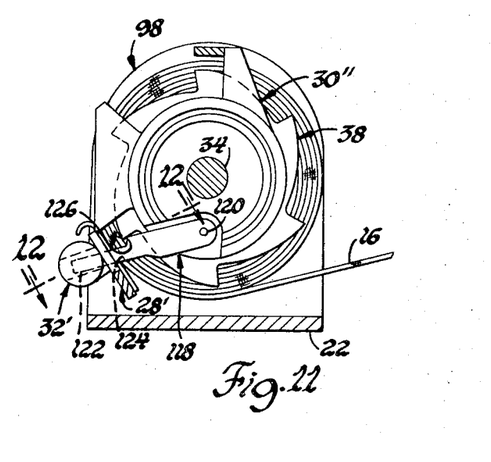
Figure 22:
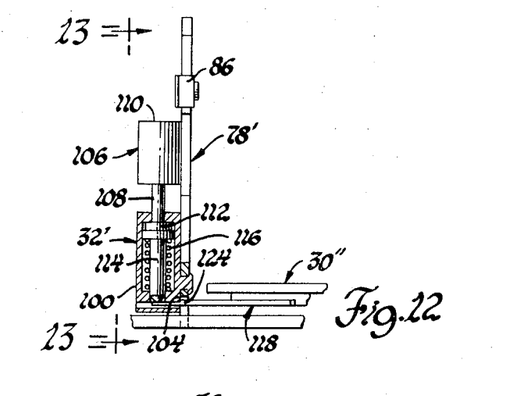

In FIGS. 16 and 17 another modified retractor apparatus denoted by the numeral 128 is depicted and again those parts of the retractor apparatus 128 which are the same as used in the retractor apparatus 20 have the same numerals and those parts which are similar have a prime (') or double prime (''). The retractor apparatus 128 is substantially the same as retractor apparatus 20 except that a modified condition responsive latch holding device 32'' is employed and a slightly different latching device 28'' is required. The latching device 28'' is substantially the same as the latching device 28 except that a latch 130 is employed with a support arm 132. Also, the latch 130 has a slightly different belt engaging portion 134 in the form of a curved slightly offset metal stamping that is secured by a rivot or the like to the latch 130. Otherwise, the latching device 28'' is the same as the latching device 28. The condition responsive latch holding device 32'' is mounted on this support arm 132 as viewed in FIG. 17 and includes a locking device 135 which is cylindrical in shape and is slidable on a support or guide rod 136 which is in turn suitably secured to the support arm 132. The locking device 135 has a locking portion 138 in the form of a tang or extension which is positioned adjacent to a stop button 140 joined to the frame 22. The device 32'' further includes a pendulum 142 having a flange portion 144 seated on the support rod 136, a weighted portion 146, and an interconnecting rod portion 148. The assemblage is completed by a spring 150 which maintains the FIG. 17 position. The dust cover 78 can also be included if wanted. When the pendulum 142 is tilted by the predetermined inertia forces, the locking device 135 is shifted upwardly as viewed in FIG. 17 so that the locking portion 138 is out of the path of the stop button 140 on the frame 22. Hence, the latching device 28'' can now be biased to the latched position by the spring 44.

Operationally, the seat belt retractor apparatus 128 performs in substantially the same way as the retractor apparatus 20. With the belt 16 stored or retracted and in the FIG. 16 position, the cam surface 62 initially and the belt 16 subsequently will have forced the latching device 28'' to the FIG. 16 position so that the latching device 28'' is in its initial latched position with the condition responsive latch holding device 32'' as illustrated in FIG. 17. In this position, the locking device locking portion 138 is separated the distance portrayed from the stop button 140 to provide the lost motion connection until the positioning device 30 is rotated clockwise as viewed in FIG. 16 during rotation of the reel 24 in the belt retracted direction. This rotation causes the positioning device 30 and specifically, the cam surface 58 to disengage the latch 130, so that the latching device 28'' is biased to its set unlatched position with the locking device's locking portion 138 in engagement with the edge of the stop button 140. Thereafter, the occupant of the seat 10 has the ability to move relatively unrestrained by the seat belt 12 until the predetermined inertia force upsets the pendulum 142 whereupon the locking portion 138 of the locking device 135 will be moved out of the path of the stop button 140 and the latching device 28'' permitted to be biased to its latched position in engagement with the teeth 40 of the ratchet wheel 38. Any subsequent rotation of the reel 22 in the belt retracted direction will bring into action the positioning device 30 and its cam surface 62, which will engage the latch 130 so as to return it to its set unlatched position and, thus, reset the condition responsive latch holding device 32''. The locking portion 138 of the locking device 134 is arranged so that during this rotation of the cam surface 62, the locking portion 138 will be in engagement with the surface of the stop button 140. This engagement is maintained by the spring 150 until the locking portion 138 is past the edge of this stop button 140 whereupon it will be biased again to the FIG. 17 position. If the condition responsive latch holding device 32'' malfunctions, the operation will be the same as described with the respect to the retractor apparatus 20.

From the foregoing it will be appreciated that the different condition latch holding responsive devices 32, 32' and 32'' each prevent the associated latching device from moving to the latched position until there is need for restraint. Hence, the occupant of the seat 10 does not have to be concerned about premature latching of the seat belt 12 and also uncomfortable restraint that would restrict movements. When restraint is required, the condition responsive latch holding devices 32, 32' and 32'' respond to the inertia forces regardless of the direction and release the associated latching device so that it can assume the latched position. Also the different latch positioning devices 30, 30' and 30'' each prevent their associated latching devices from ratcheting during movement of the belt 16 in the belt retracted direction and additionally, insure that latching devices are removed from the latched position in the event there is a malfunction of the condition responsive latch holding devices. This is enabled by the use of the lost motion connection whereby the positioning devices 30, 30' and 30'' each perform to hold the latching device in the initial unlatched position until after the seat belt buckle 18 is buckled, whereupon the buckling maneuver creates the slight retraction of the reel in the belt retracted direction so that the positioning device 30, 30' and 30'' release the latching device for movement to the set unlatched position. Each of the latch positioning devices 30, 30' and 30'' perform the further function of resetting the latching device in the reset unlatched position once the holding device has been actuated by the predetermined inertia force. Additionally, the total assemblage is compact which is further facilitated when the condition responsive latch holding devices are mounted on the latch.

It should be kept in mind that although inertia forces are responded to by the condition responsive latch holding devices 32, 32' and 32'' other conditions indicative of the need for restraint could be used; e.g., acceleration and deceleration extremes could be used.

What is claimed is:

1. In seat belt retractor apparatus, the combination of a frame element having a reel member rotatably supported thereon; a belt wound on the reel member for movement in both belt extended and belt retracted directions; reel member bias means urging the reel member to a belt retracted position; latching means resisting rotation of the reel member in a belt extended direction; the latching means including a ratchet member revolvable with the reel member, a latch element rotatably positioned on the frame element and having a latched position in engagement with the ratchet member so as to prevent rotation of the reel member in the belt extended direction and also having first and second unlatched positions in each of which the latch element is out of engagement with the rachet member so as to permit unrestrained rotation of the reel member in either direction, means on the latch element for engaging the belt and moving the latch element to the first unlatched position when retracted and latch element bias means urging the latch element to the latched position; latch element positioning means releasably drive connected to the reel member for movement therewith; the latch element positioning means having movable stop means operative to maintain the latch element in the first unlatched position thereof during rotation of the reel member in the belt extended direction and then being movable to release the latch element upon a certain initial rotation of the reel member in the belt retracted direction and to the second unlatched position and also having cam means for holding the latch element out of engagement with the ratchet member during subsequent rotation of the reel member in the belt retracted direction and until the belt engages the latch element; and condition responsive latch element holding means maintaining the latch element in the second unlatched position thereof; the condition responsive latch element holding means being operative in response to a certain inertia forces imposed thereon to release the latch element so as to permit the latch element to be biased by the latch element bias means to the latched position, the latch element holding means having a lost motion connection with the latch element so as to permit the latch element to be moved between the first unlatched position and the second unlatched position.

2. Seat belt retractor apparatus as described in claim 1, wherein the latch element positioning means includes clutch means releasably drive connecting the latch element positioning means for movement with the reel member so as to operate the cam means and thereby hold the latch element in the first unlatched position thereof during movement of the reel member in the belt extended direction, to operate the stop means to release the latch element upon a predetermined initial movement of the reel member in the belt retracted direction and to operate the cam means to hold the latch element out of engagement with the ratchet member during subsequent movement of the reel member in the belt retracted direction.

3. Seat belt retractor apparatus as described in claim 2, wherein the latch element positioning means further includes a stop on the frame element for restricting rotation of the latch element positioning means in both the belt extended and belt retracted directions and the stop means are engageable with the stop in each of a latch element restraining setting and a latch element releasing setting so as in the latch element restraining setting thereof to hold the latch element in the first unlatched position thereof and in the latch element releasing setting thereof to release the latch element.

4. Seat belt retractor apparatus as described in claim 2, wherein the cam means includes a cam surface engageable with the latch element in a latch element restraining setting thereof so as to hold the latch element in the first unlatched setting thereof during movement of the reel member in a belt extended direction and a cam element pivotally joined to the cam means and engagable with the latch element so as to urge the latch element out of engagement with the ratchet member during movement of the reel member in the belt retracted direction.

5. Seat belt retractor apparatus as described in claim 4, wherein the latch element has a guide opening therethrough and the cam element includes a rod portion extending through the guide opening in the latch element and a cam portion engageable with the latch element during movement of the reel member in the belt retracted direction.

6. Seat belt retractor apparatus as described in claim 1, wherein the condition responsive latch element holding means includes inertia means responsive to inertia forces acting on the retractor apparatus, the inertia means being supported on one of the elements and being constructed and arranged for movement in any direction from a set position to an unset position in response to an inertia force of a certain magnitude acting thereon, the holding means also including bias means returning the inertia means to the set position upon reduction of the inertia force and locking means actuatable by the inertia means, when moved from the set position to the unset position thereof, from a locked position in which the latch element is maintained in the second unlatched position to an unlocked position in which the latch element is released for return to the latched position.

7. Seat belt retractor apparatus as described in claim 6, wherein the inertia means is a pendulum.

8. Seat belt retractor apparatus as described in claim 6, wherein the locking means includes a locking portion arranged so as to engage one of the elements and prevent movement of the latch element from the second unlatched position to the latched position.

9. Seat belt retractor apparatus as described in claim 2, wherein the condition responsive latch element holding means includes inertia means responsive to inertia forces acting on the retractor apparatus and being movably supported on one of said elements for movement in any direction from a set position to an unset position in response to an inertia force of a certain magnitude acting thereon, bias means returning the inertia means to the set position upon reduction of the inertia force and locking means actuatable by the inertia means, when moved from the set position to the unset position thereof, from a locked position in which the latch element is maintained in the second unlatched position to an unlocked position in which the latch element is released for return to the latched position.

10. Seat belt retractor apparatus as described in claim 3, wherein the condition responsive latch element holding means includes inertia means responsive to the inertia forces acting on the retractor apparatus and being movably supported by the latch element for movement in any direction from a set position to an unset position in response to an inertia force of a certain magnitude acting thereon, bias means returning the inertia means to the set position upon reduction of the inertia force, and locking means actuatable by the inertia means when moved from the set position to the unset position thereof, from a locked position in which the latch element is held in the second unlatched position to an unlocked position in which the latch element is released for return to the latched position.

11. Seat belt retractor apparatus as described in claim 5, wherein the condition responsive latch element holding means includes pendulum means responsive to inertia forces acting on the retractor apparatus and being movably supported on the frame element for movement in any direction from a set position to an unset position in response to an inertia force of a certain magnitude acting thereon, bias means returning the pendulum means to the set position upon reduction of the inertia force, locking means maneuverable by the pendulum means when the pendulum means is moved from the set position to the unset position thereof from a locked position in which the latch element is maintained in the second unlatched position to the unlocked position in which the latch element is released for return to the latched position.

12. Seat belt retractor apparatus as described in claim 3, wherein the condition response latch element holding means includes pendulum means responsive to inertia forces acting on the retractor apparatus, the pendulum means being movably supported on the latch element for movement in any direction from a set position to an unset position in response to an inertia force of a certain magnitude acting thereon, the holding means further including bias means returning the pendulum means to the set position upon reduction of the inertia force acting thereon, a stop on the frame element, locking means maneuverable by the pendulum means, when the pendulum means moves from the set position to the unset position thereof, from a locking position to an unlocking position, the locking means in the locking position thereof having a locking position engageable with the frame element stop so as to hold the latch element in the second unlatched position thereof and disengageable from the frame element stop in the unlocking position thereof so as to release the latch element for return to the latched position.

\* \* \* \* \*

UNITED STATES PATENT OFFICE
CERTIFICATE OF CORRECTION

Patent No. 3,837,594  Dated September 24, 1974

Inventor(s) Gerald F. Lewis

It is certified that error appears in the above-identified patent and that said Letters Patent are hereby corrected as shown below:

Column 1, line 51, delete "predetermined" from end of line.

Column 8, line 49, change "30'" to --30"--.

Signed and sealed this 4th day of February 1975.

(SEAL)
Attest:

McCOY M. GIBSON JR.
Attesting Officer

C. MARSHALL DANN
Commissioner of Patents